US012460619B2

(12) United States Patent
Evans et al.

(10) Patent No.: US 12,460,619 B2
(45) Date of Patent: Nov. 4, 2025

(54) SYSTEM AND METHOD FOR OPTIMIZING WIND FARM PERFORMANCE USING UNMANNED AERIAL VEHICLES

(71) Applicant: General Electric Renovables Espana, S.L., Barcelona (ES)

(72) Inventors: Scott Charles Evans, Burnt Hills, NY (US); Samual Bryan Shartzer, Greenville, SC (US); Stefan Kern, Munich (DE); Tapan Ravin Shah, Los Altos, CA (US); Anveshi Charuvaka, Tracy, CA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 407 days.

(21) Appl. No.: 18/159,706

(22) Filed: Jan. 26, 2023

(65) Prior Publication Data

US 2024/0254966 A1 Aug. 1, 2024

(51) Int. Cl.
*F03D 7/04* (2006.01)
*B64U 20/80* (2023.01)
(Continued)

(52) U.S. Cl.
CPC ............. *F03D 7/048* (2013.01); *B64U 20/80* (2023.01); *F03D 7/0224* (2013.01); *F03D 7/0276* (2013.01); *F03D 7/045* (2013.01); *F03D 7/046* (2013.01); *B64U 2101/35* (2023.01); *F05B 2270/32* (2013.01); *F05B 2270/321* (2013.01); *F05B 2270/323* (2013.01); *F05B 2270/325* (2013.01)

(58) Field of Classification Search
None
See application file for complete search history.

(56) References Cited

U.S. PATENT DOCUMENTS 10,023,323 B1 7/2018 Roberts et al.
11,542,923 B1 * 1/2023 Messinger .............. F03D 13/20
(Continued)

FOREIGN PATENT DOCUMENTS

| EP | 2 525 243 A1 | 11/2012 |
| EP | 3 020 963 A1 | 5/2016 |
| EP | 3783221 A1 | 2/2021 |

OTHER PUBLICATIONS

EPO Search Report, Jun. 4, 2024.
(Continued)

*Primary Examiner* — Sean Shechtman
(74) *Attorney, Agent, or Firm* — Dority & Manning, P.A.

(57) ABSTRACT

A method for optimizing performance of a wind farm having at least one wind turbine includes maneuvering a first unmanned aerial vehicle (UAV) having at least one sensor to a first location near the at least one wind turbine of the wind farm; collecting, via the at least one sensor of the first UAV, data corresponding to one or more wind conditions at the at least one wind turbine; receiving the data corresponding to the one or more wind conditions at the at least one wind turbine via a controller; generating a control action for the at least one wind turbine using the data corresponding to the one or more wind condition at the at least one wind turbine; and implementing, via the controller, the control action.

16 Claims, 8 Drawing Sheets

(51) Int. Cl.
*B64U 101/35* (2023.01)
*F03D 7/02* (2006.01)

(56) References Cited

U.S. PATENT DOCUMENTS

2019/0170123 A1  6/2019  Mertens et al.
2021/0363969 A1  11/2021  Egedal et al.

OTHER PUBLICATIONS

Kocer et al., Full-Scale Wind Turbine Wake Measurements Using an Instrumented UAV, Jan. 1, 2011, http:/proceedings.ewea.org/annual2011/allfiles/570_EWEA2011presentation.pdf.
Ashwin Renganathan S et al., Data-Driven Wind Turbine Wake Modeling via Probabilistic Machine Learning, Neural Computing and Applications, Jan. 11, 2022, vol. 34, Nr: 8, pp. 6171-6186.

* cited by examiner

SYSTEM AND METHOD FOR OPTIMIZING WIND FARM PERFORMANCE USING UNMANNED AERIAL VEHICLES

FIELD

The present disclosure relates generally to wind turbines, and more particularly, to systems and methods for monitoring wind turbines using unmanned aerial vehicles.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, certain internal and external components of the wind turbine are subjected to a variety of loads. If such loads exceed a certain threshold, then the components are at risk of failure. Though the components are designed to withstand a certain amount of loading, wind conditions are not always predictable and can cause excessive component damage. In worst-case scenarios, damage to the components can cause the entire wind turbine to be shut down such that appropriate maintenance and/or repair measures can be scheduled. Such downtime causes a loss of annual energy production and therefore is expensive and undesirable.

To avoid unnecessary shutdowns, various sensors are often provided on or near the wind turbine to monitor environmental conditions in proximity to the wind turbine. An example of a commonly used array of sensors is a measurement tower or a met mast. A met mast is a freestanding tower that includes one or more anemometers, as an example, and is typically placed in proximity of the wind turbine such that the sensor can measure the environmental conditions around the wind turbine. Metmasts are desirable (over for example sensors that exist on the nacelle of the wind turbine) because they can give objective readings of wind speed and other sensors, whereas turbine mounted sensors are affected by, for example, the pitch of the turbine blades. However, met masts are typically expensive and require data to be filtered that is not within the line of sight defined by the met mast and the wind turbine of interest. Because of this, the industry is continuously seeking new methods of monitoring environmental conditions surrounding the wind turbine to optimize the performance thereof.

Accordingly, a system and method that addresses the aforementioned issues would be advantageous. Thus, the present disclosure is directed to a system and method for monitoring wind turbines using unmanned aerial vehicles so as to optimize performance of the wind turbine.

BRIEF DESCRIPTION

Aspects and advantages of the invention will be set forth in part in the following description, or may be obvious from the description, or may be learned through practice of the invention.

In one aspect, the present disclosure is directed to a method for optimizing performance of a wind farm having at least one wind turbine. The method includes maneuvering a first unmanned aerial vehicle (UAV) having at least one sensor to a first location near the at least one wind turbine of the wind farm. The method also includes collecting, via the at least one sensor of the first UAV, data corresponding to one or more wind conditions at the at least one wind turbine. The method also includes receiving the data corresponding to the one or more wind conditions at the at least one wind turbine via a controller. The method also includes generating a control action for the at least one wind turbine using the data corresponding to the one or more wind condition at the at least one wind turbine; and implementing, via the controller, the control action.

In an embodiment, the control action is generated via at least one machine learning algorithm programmed in the controller. In addition, the data is input within the machine learning algorithm.

In another embodiment, the one or more wind conditions include at least one of wind speed, wind shear, wind direction, wake, turbulence intensity, temperature, humidity, or air density.

In still another embodiment, the wind farm includes a plurality of wind turbines, the plurality of wind turbines including the at least one wind turbine. In addition, the control action further includes at least one of pitching one or more rotor blades of one or more of the plurality of wind turbines, yawing one or more of the plurality of wind turbines, modifying a speed of one or more of the plurality of wind turbines, derating power on one or more of the plurality of wind turbines, or uprating power on one or more of the plurality of wind turbines.

In yet another embodiment, the at least one wind turbine is a first wind turbine. Further, the plurality of wind turbines further includes a second wind turbine. Furthermore, the control action further includes implementing the control action on the first wind turbine so as to cause the second wind turbine to be positioned outside of wake of the first wind turbine.

In yet still another embodiment, the controller is further configured to generate a power curve or other model of power performance vs. wind conditions for the at least one wind turbine.

In a further embodiment, the method further includes maneuvering the first UAV to a second location around the at least one wind turbine different from the first location.

In a still further embodiment, the method further includes continuously sending the data to an archival repository, turbine, or farm level controller such that the data can be used for turbine/farm control as guided by the learned machine learning algorithm. Further, the data is configured to be used for offline training or continuous updating or optimization of the machine learning algorithm using the data.

In yet a further embodiment, the machine learning algorithm is further configured to generate a simulated model of the wind farm for estimating or predicting performance of the wind farm or the at least one wind turbine.

In yet another embodiment, the method further includes generating, via the machine learning algorithm, a prioritized list of desired data that instructs the most desired second location to retrieve the data. Further, the second location includes an area with the greatest uncertainty and highest value for use in improving the machine learning algorithm. The method also further includes maneuvering the UAV to the second location.

In yet still another embodiment, the method further includes transmitting the data to the controller in real-time.

In still yet another embodiment, the method further includes maneuvering a second UAV around the at least one wind turbine and collecting additional data relating to the wind farm using a sensor mounted to the second UAV.

In still yet a further embodiment, the first UAV further includes an emitter and an receiver mounted thereto. The method also further includes emitting, via the emitter, an acoustic signal; receiving the acoustic signal via the acoustic receiver; and determining the one or more wind conditions based on changes in the acoustic signal as the acoustic signal moves from the emitter to the receiver.

In still yet another further embodiment, the method further includes collecting, via one or more fixed sensors of the wind turbine, data corresponding to one or more wind conditions at the at least one wind turbine, wherein the one or more fixed sensors include at least one of LIDAR ("laser imaging, detection, and ranging"), sonar, or sensors capable of detecting wind speed, temperature, pressure, humidity, air density, or power generated by the at least one wind turbine.

In another aspect, the present disclosure is directed to a system for optimizing performance of a wind farm having at least one wind turbine. The system includes at least one wind turbine of the wind farm. The system also includes a first unmanned aerial vehicle (UAV) having at least one sensor, the sensor configured to collect data corresponding to one or more wind conditions at the at least one wind turbine. The system also includes a controller configured to receive the data corresponding to one or more wind conditions at the at least one wind turbine. Further, the controller generates a control action for the at least one wind turbine using the data corresponding to the one or more wind condition at the at least one wind turbine. Furthermore, the control action is implemented via the controller.

In yet another aspect, the present disclosure is directed to a method for optimizing performance of a wind farm having at least one wind turbine. The method includes maneuvering a first unmanned aerial vehicle (UAV) having at least one sensor to a first location near the at least one wind turbine of the wind farm. The method also includes collecting, via the at least one sensor of the first UAV, data corresponding to one or more wind conditions at the at least one wind turbine. The method also includes receiving the data corresponding to the one or more wind conditions at the at least one wind turbine via a controller. The method also includes generating, via a machine learning algorithm programmed in the controller, a control action for the at least one wind turbine using the data corresponding to the one or more wind condition at the at least one wind turbine. The method also includes implementing, via the controller, the control action These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
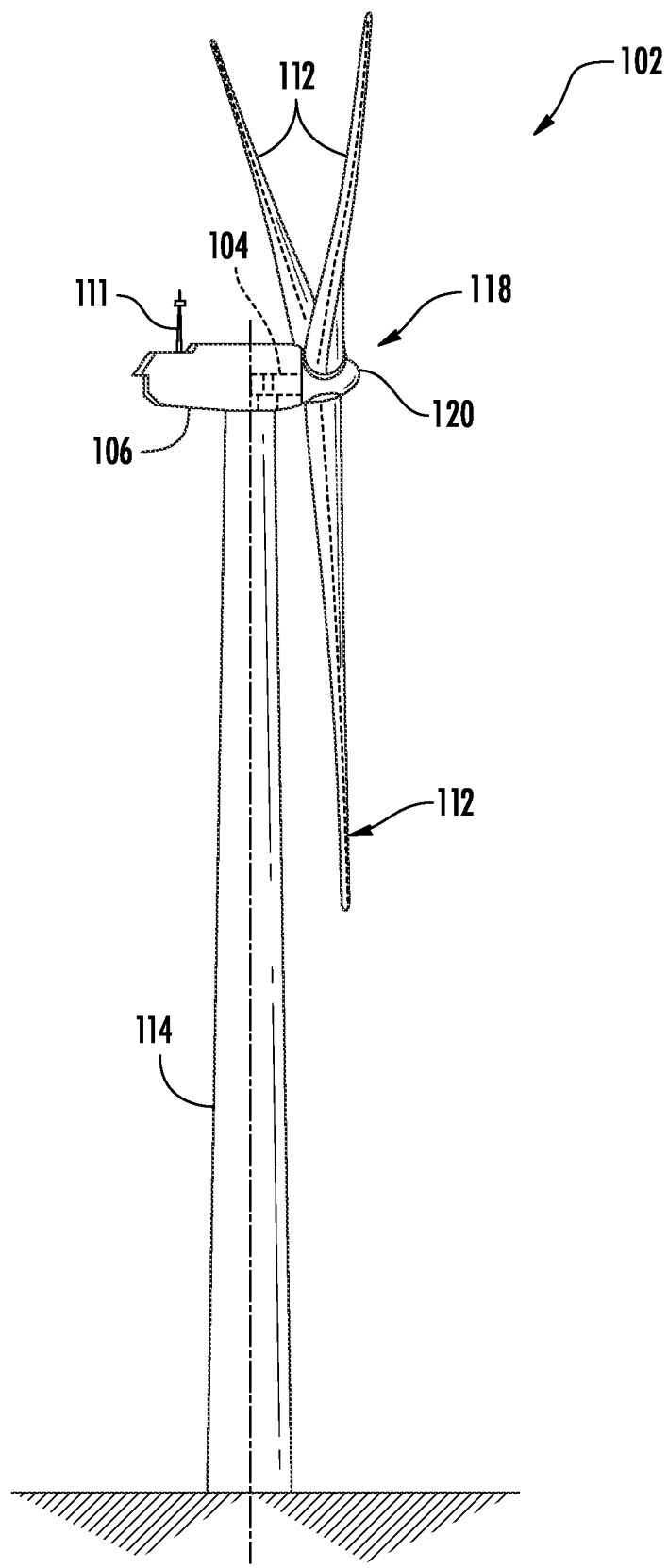
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

An unmanned aerial vehicle (UAV) is an aircraft with an onboard programmable controller that may be flown via remote control or and does not require the presence of an onboard pilot like conventional aircraft. As a consequence, a UAV may be maneuvered in a manner a conventional pilot-flown aircraft is not able to. Thus, the present disclosure is directed to a UAV having a plurality of sensors configured to monitor a variety of conditions at locations that may not otherwise be accessible. For example, a UAV may be capable of monitoring wind conditions or other environmental conditions at or around a wind turbine. Moreover, unlike traditional methods of monitoring wind conditions around wind turbines, like met masts, a UAV may be maneuvered such that data irrelevant to the monitoring of the condition at or around a wind turbine may be reduced or eliminated. Furthermore, the UAV may be further maneuvered to particularly obtain data that is especially needed for the monitoring of a wind condition at or around a wind turbine. Accordingly, a UAV is capable of being maneuvered such that collected data may not need to be filtered, like a conventional met mast. Because the data need not be filtered, optimization of a wind turbine or wind turbine may be accomplished more accurately or more efficiently.

As such, the present disclosure is directed to a method for optimizing performance of a wind turbine or a wind farm using one or more UAVs. In an embodiment, for example, the method includes placing a sensor on a UAV and generating, via the sensor, data corresponding to a wind condition around the wind turbine or wind farm, for example, tracking or assessing wind wakes and how they move in response to turbine positions and wind directions. Further, in an embodiment, the data may correspond to a wind condition around the wind turbine. Furthermore, the UAV may be maneuvered to a particular location of interest, such as within sensing range of the wind condition. Once the sensor acquires data corresponding to either the wake or wind condition, the data can be input into a controller of either the wind farm or the wind turbine and used to generate one or more instructions, or saved as data from which machine learning algorithms can learn waking effects and other environmental conditions and their dynamic response. For example, the instruction(s) can be generated using a machine learning algorithm. The instruction(s) can then be transmitted to the turbine-level controller to modify a condition of the wind turbine in order to optimize performance of the individual turbine or farm, or reduce loads.

Accordingly, the present disclosure provides many advantages over prior art systems. For example, by using a UAV to particularly track a wind condition, a wind turbine can be oriented so that the function of the wind farm or the wind turbine is optimized. Further, multiple UAVs can be used together to measure wind conditions around the wind turbine which require sensors at separate locations. For example, a first UAV may be placed at one location and a second UAV may be placed at a different, second location to properly monitor conditions around the wind turbine.

In certain embodiments, shear profiles and/or wind speed can be calculated by providing multiple UAVs in communication with each other. In addition, shear profiles can also be calculated by maneuvering a single UAV to multiple locations. Further, machine learning may allow for more accurate determination of a wind condition around a wind turbine. For example, machine learning algorithm(s) may be trained by data acquired by the UAV(s). Once trained, the machine learning algorithm(s) may be able to predict future wind conditions, thereby improving the overall monitoring of the wind farm and/or individual wind turbines.

Referring now to the drawings, FIG. 1 illustrates a perspective view of an embodiment of a wind turbine 102 according to the present disclosure. As shown, the wind turbines 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118. It should be appreciated that the wind turbine 102 of FIG. 1 is provided for illustrative purposes only. Thus, one of ordinary skill in the art should understand that the invention is not limited to any particular type of wind turbine configuration. The wind turbine 102 may also a sensor 111 affixed to the wind turbine 102. The fixed sensor 111 may be configured to collect data corresponding to one or more wind conditions at the wind turbine 102. For example, the fixed sensors 111 may be LIDAR or sonar, or the fixed sensors 111 may be capable of detecting wind speed, temperature, pressure, humidity, air density or power generated by the wind turbine 102.

Figure 2:
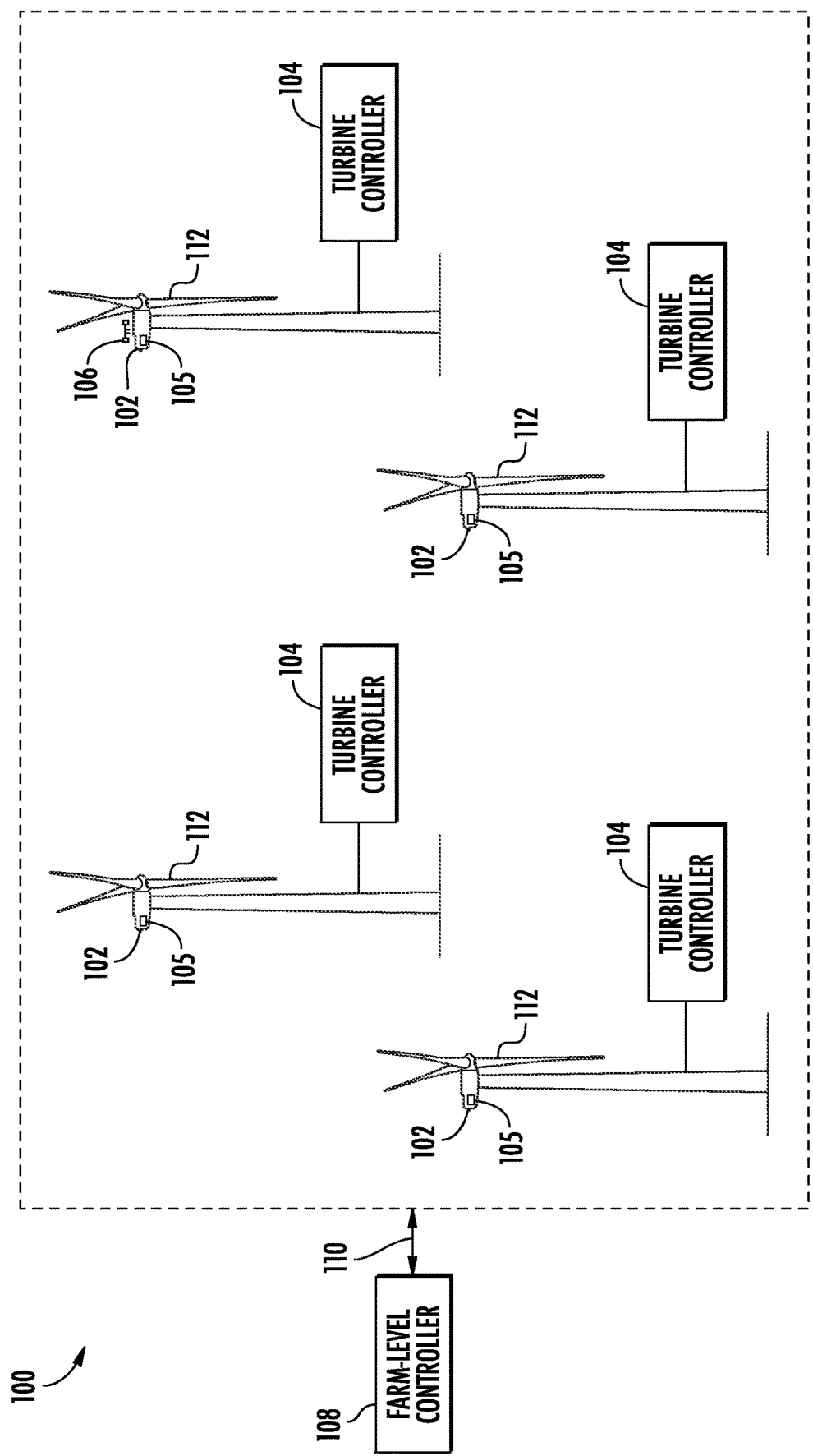
FIG. 2 illustrates a perspective view of an embodiment of a wind farm according to the present disclosure.

Referring now to FIG. 2, the wind turbine 102 may be part of a wind farm 100. More particularly, FIG. 2 illustrates a schematic diagram of an embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Further, FIG. 2 illustrates an example layout of an embodiment of the wind farm 100. Typically, wind turbine arrangement in a wind farm is determined based on numerous optimization algorithms such that AEP is maximized for corresponding site wind climate. It should be understood that any wind turbine arrangement may be implemented, such as on uneven land, without departing from the scope of the present disclosure.

Moreover, as shown in FIG. 2, each wind turbine 102 of the wind farm 100 may also include a turbine controller 104 communicatively coupled to a farm-level controller 108. Moreover, in an embodiment, the farm-level controller 108 may be coupled to the turbine controllers 104 through a network 110 to facilitate communication between the various wind farm components.

Referring still to FIG. 2, the network 110 that couples the farm-level controller 108, the turbine controllers 104, and/or the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm controller 108 in near real time.

Figure 3:
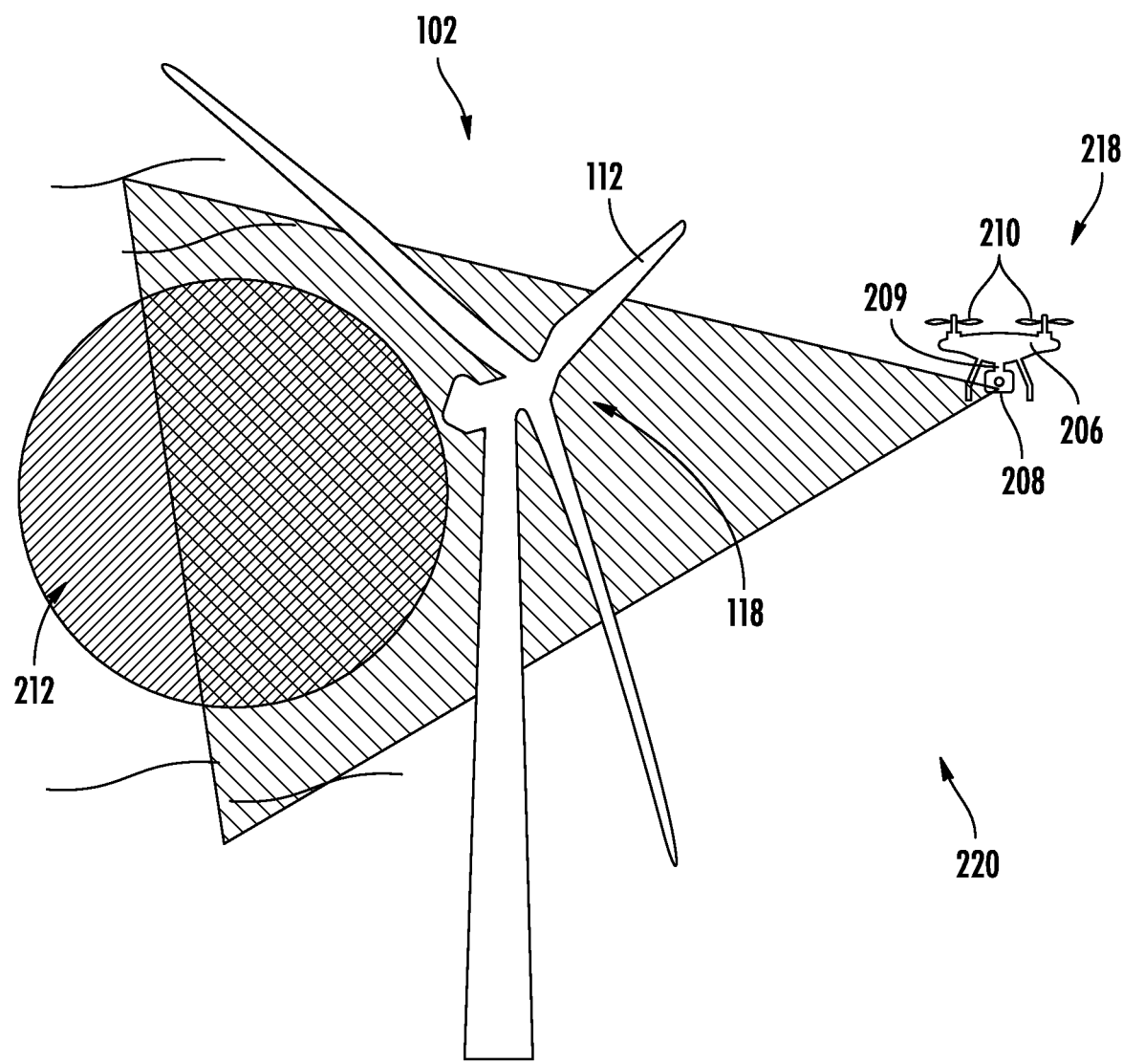
FIG. 3 illustrates a perspective view of an embodiment of an unmanned aerial vehicle monitoring an environmental condition of a wind turbine according to the present disclosure.
Figure 4:
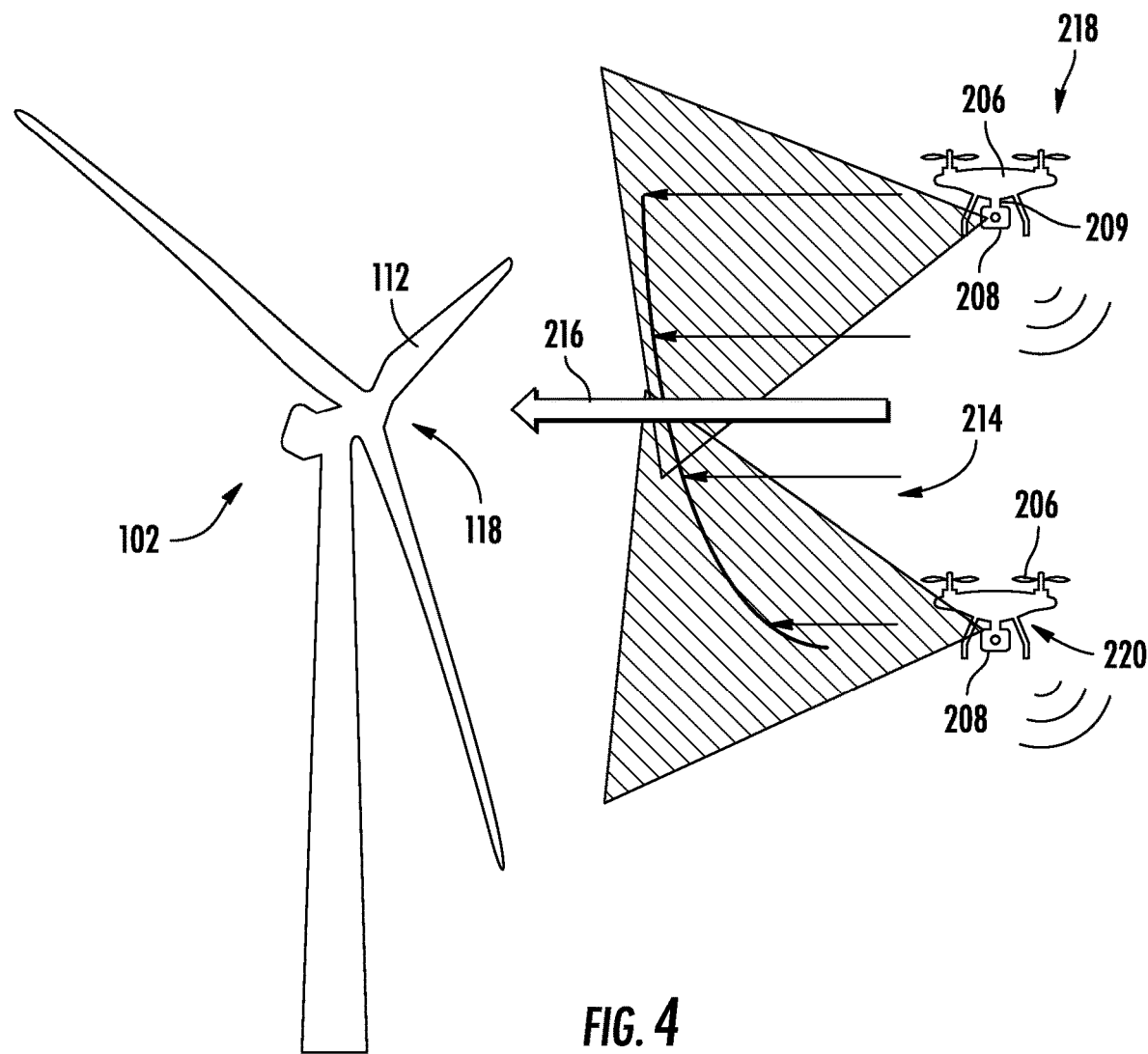
FIG. 4 illustrates a perspective view of an embodiment of multiple unmanned aerial vehicles monitoring an environmental condition of a wind turbine according to the present disclosure.
Figure 5:
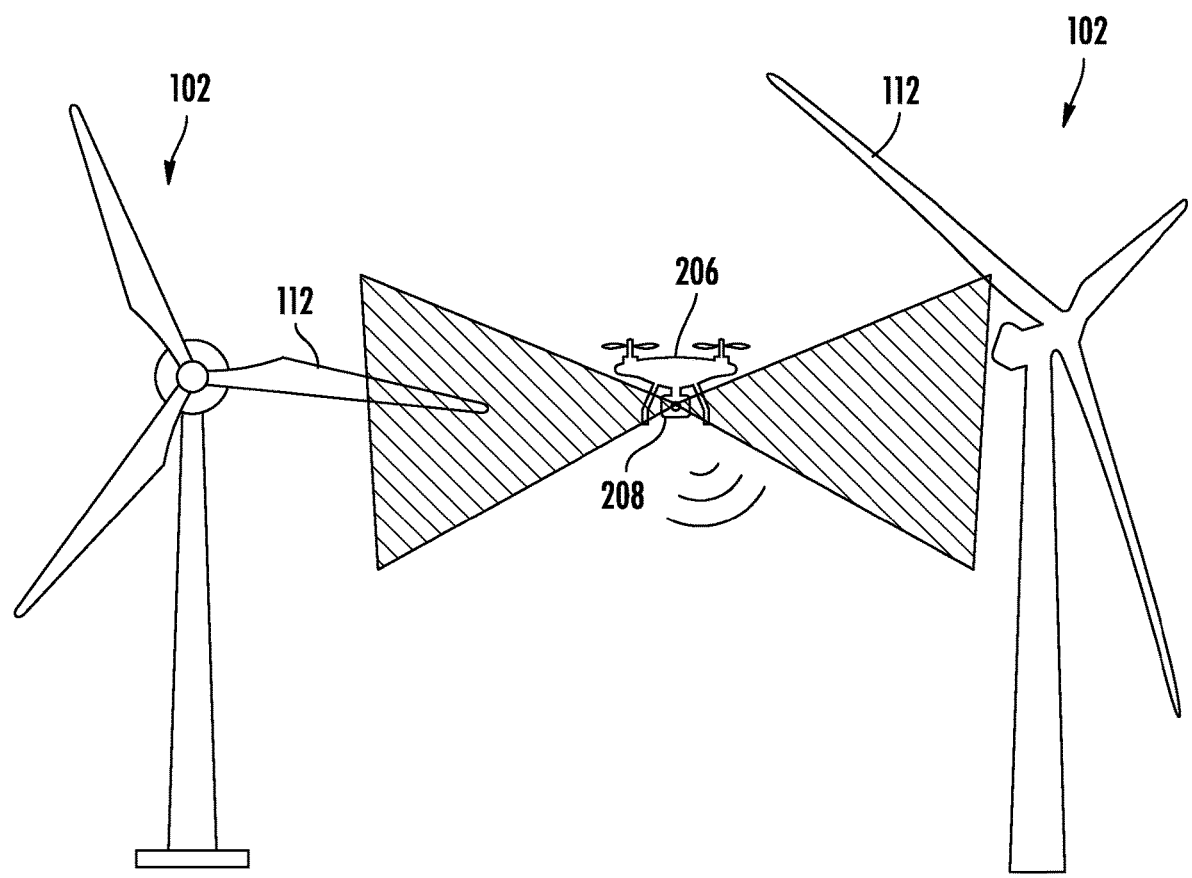
FIG. 5 illustrates a perspective view of an embodiment of an unmanned aerial vehicle monitoring multiple environmental conditions from multiple wind turbines according to the present disclosure.

Referring now to FIGS. 3-5, various embodiments of a UAV or multiple UAVs monitoring a variable of a wind turbine according to the present disclosure are illustrated. As shown particularly in FIG. 3, a UAV 206 is maneuvered around a wind turbine 102. More specifically, as shown, the UAV 206 is shown as being maneuvered toward the front of the wind turbine 102, however, it should be understood that the UAV 206 may also maneuvered to other locations as will be discussed hereinbelow. Multiple UAVs 206 may also be used as shown in FIGS. 4-5 hereinbelow.

In addition, as shown, the UAV(s) 206 includes at least one sensor 208 and one or more maneuvering mechanisms 210. In such embodiments, the sensor(s) 208 is configured to monitor environmental data of the wind turbine 102, such as a wind condition. Wind conditions may include, but are not limited to, wind speed, wind shear, wind direction, wake, etc. Still other environmental data may include turbulence intensity, temperature, humidity, air density, etc. Thus, the sensor(s) 208 may be any suitable type of sensor such as wind speed sensors (both horizontal and vertical) and sensors capable of detecting wind turbulence, pressure, temperature, density, humidity, or noise. The sensor(s) 208 may also be sensors such as LIDAR or sonar. The sensor(s) 208 may also provide the data to the turbine-level controller 104 or the farm-level controller 108 in real-time.

In an exemplary embodiment, as shown in FIG. 3, the sensor(s) 208 may be mounted to a bottom surface of the UAV(s) 206. For example, as shown in FIGS. 3 and 4, the sensor(s) 208 may be secured to the bottom surface using, e.g., a rod member 209 to ensure that the maneuvering mechanism 210 does not interfere with the sensor(s) 208 either by mechanically blocking the pathway of the sensor(s) 208 or by generating an interfering wind condition that could influence with sensor measurements of the sensor(s) 208.

In an embodiment, as shown in FIG. 3, the sensor(s) 208 may be capable of monitoring and/or tracking a location or shape of a wake 212 resulting from the rotor 118 or the rotor blades 112 of the wind turbine 102 capturing wind energy passing around the wind turbine 102. The sensor(s) 208 may also be capable of generating data corresponding to the location or shape of the wake 212. The sensor(s) 208 may also be capable of monitoring and/or tracking other wind conditions. For example, as shown in FIG. 4, the wind condition may include a shear 214 of wind traveling toward the rotor 118. The wind condition may also include a wind speed 216 around the wind turbine 102.

The UAV(s) 206 may also be maneuvered to a particular location 218 depending on the wind conditions being monitored. For example, if the wake 212 is being monitored, the UAV(s) 206 may be maneuvered to a rear side of the wind turbine 102. In doing so, the wake 212 may be more effectively monitored because the sensor(s) 208 has an improved line of sight of the wake 212 generated by the wind turbine 102.

In another example, if the shear 214 of wind traveling toward the rotor 118 is being monitored, the UAV(s) 206 may be maneuvered to the front of the rotor 118. In doing so, the profile of the shear 214 may be more effectively monitored as the shear 214 travels toward the rotor 118 of the wind turbine 102. Wind speed 216 may also be tracked at distinct locations as desired.

As shown particularly in FIG. 3, the UAV(s) 206 may also be maneuvered to multiple locations 218, 220 to monitor the wake 212, the shear 214, or the wind speed 216. For example, as shown, a first location 218 may be at a different altitude compared to the second location 220. The first location 218 and second location 220 may also be different latitudinal locations and/or different longitudinal locations with respect to each other. Although only two locations 218, 220 are described, any number of locations may be utilized as needed.

By maneuvering the UAV(s) 206 to multiple locations 218, 220, the UAV(s) 206 may be able to provide data from more than one surrounding area of the wind turbine 102. For example, when the UAV(s) 206 and sensor(s) 208 are monitoring the wake 212, the UAV(s) 206 may be maneuvered to the first location 218 and then to the second location 220 to monitor the wake 212 from different heights or angles so as to develop a more complete view of the wake 212. However, it should be understood that the UAV(s) 206 may also operate effectively by monitoring and/or tracking the wake 212 from a single position.

For example, when the UAV(s) 206 and sensor(s) 208 are monitoring the shear 214, the first location 218 of the UAV(s) 206 may be at a lower altitude or a higher altitude in relation to the second location 220. Multiple locations 218, 220 may provide particular benefits when using a singular UAV 206 to track a shear 214. In particular, by maneuvering a single UAV 206 to multiple locations 218, 220 at different altitudes, the single UAV 206 may be capable of monitoring the shear 214 when two UAVs 206 may have otherwise been required.

Referring now particularly to FIG. 5, a schematic view of an embodiment of two wind turbines 102 having a UAV 206 maneuvered between the wind turbines 102 for monitoring an environmental condition therebetween is illustrated. Furthermore, as shown particularly to FIG. 6, a schematic view of an embodiment of a wind farm 100 having multiple UAVs 206 monitoring an environmental condition of the wind farm 100 is illustrated. Thus, as shown particularly in FIG. 6, the UAVs 206 are maneuvered between multiple wind turbines 102. Once maneuvered to the desired locations, the UAVs 206 are configured to collect data simultaneously from the wind turbines 102 such as a wind condition or an environmental condition, which are further described herein. Accordingly, in each of the embodiments of FIGS. 5 and 6, the sensor(s) 208 may be capable of monitoring multiple variables or conditions from multiple wind turbines 102. Specifically, the sensor 208(s) can monitor the location or shape of the wake 212 of multiple wind turbines 102 or another wind condition such as the shear 214 or wind speed 216.

Figure 6:
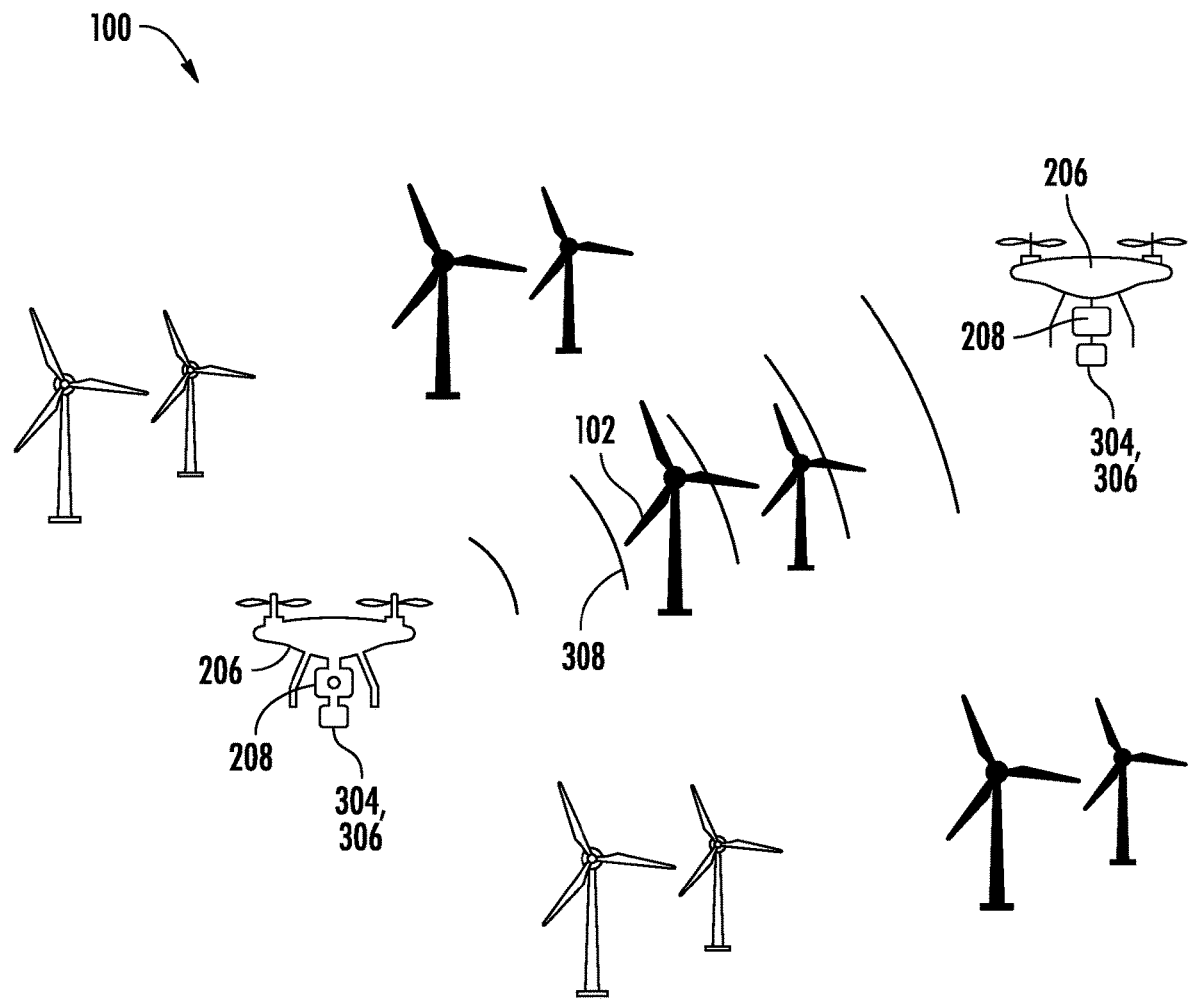
FIG. 6 illustrates a perspective view of an embodiment of a wind farm and multiple unmanned aerial vehicles, particularly illustrating communication between the unmanned aerial vehicles for monitoring environmental conditions of the wind farm according to the present disclosure.

In another embodiment, as shown in FIG. 6, the UAVs 206 may be configured to communicate with each other. Accordingly, in particular embodiments, as shown, the UAVs 206 may further include at least one receiver 304 and at least one emitter 306. Thus, in an embodiment, the emitter 306 is capable to emit an acoustic signal 308 or series of acoustic signals 308, while the receiver 304 is capable of detecting the acoustic signal(s) 308 emitted by the emitter 306. By emitting and detecting acoustic signals(s) 308, the receivers and emitters 304, 306 can provide feedback to the sensor(s) 208 that can be used to determine the wind condition(s) around one or more wind turbines 102 within the wind farm 100. In particular, the sensor(s) 208 may be able to determine a velocity shift of the acoustic signal(s) 308 from the transmission by the emitter 306 to the reception by the receiver 304 as the acoustic signal(s) 308 move from the emitter 306 to the receiver 304. Further, the sensor(s) 208 may be configured to receive acoustic signals 308 in addition to or in place of the receiver 304.

Figure 7:
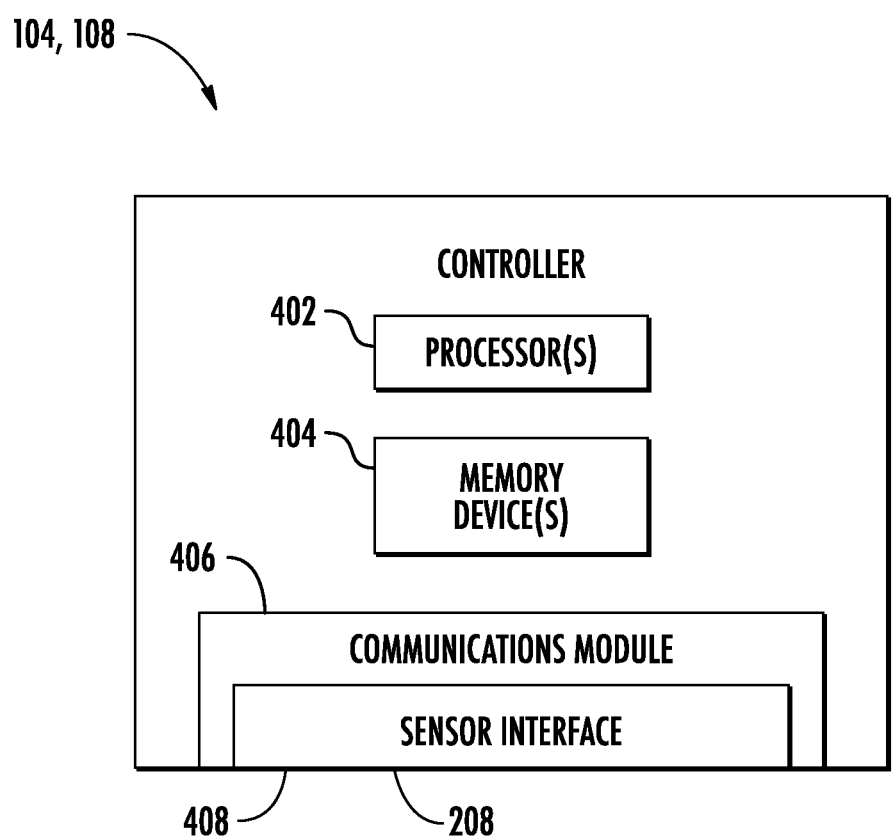
FIG. 7 illustrates a block diagram of an embodiment of a controller of a wind turbine or wind farm according to the present disclosure.

The data collected by the UAVs can then be input into a controller, such as the turbine-level controller 104 and/or the farm-level controller 108. For example, referring now to FIG. 7, a block diagram of an embodiment of a controller, such as the turbine-level controller 104 and/or the farm-level controller 108 is illustrated. As shown, the controller(s) 104, 108 may include one or more processor(s) 402 and associated memory device(s) 404 configured to perform a variety of computer-implemented functions (e.g., performing the methods, steps, calculations and the like and storing relevant data as disclosed herein). Additionally, the controller(s) 104, 108 may also include a communications module 406 to facilitate communications between the controller(s) 104, 108 and the various components of the wind turbine 102.

Further, the communications module 406 may include a sensor interface 408 (e.g., one or more analog-to-digital converters) to receive signals transmitted from the sensor(s) 208 communicatively coupled to one or more sensors (such as the sensor(s) 208 described above). For example, the communications module can convert signals received from the sensor(s) 208 into a format that can be understood and processed by the processors 402.

It should be appreciated that the sensor(s) 208 may be communicatively coupled to the communications module 406 using any suitable means. For example, as shown, the sensor(s) 208 are coupled to the sensor interface 408 via a wireless connection, such as by using any suitable wireless communications protocol known in the art. However, in other embodiments, the sensor(s) 208 may be coupled to the sensor interface 408 via a wired connection by an operator once the UAV(s) 206 have been recovered.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 404 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 404 may generally be configured to store suitable computer-readable instructions that, when implemented by the processor(s) 402, configure the controller(s) 104, 108 to perform various functions as described herein.

In additional embodiments, the processor(s) 402 described herein may also be configured to implement one or more algorithms, such as a machine learning algorithm. Further, the machine learning algorithm(s) may be a trained neural network, a simple linear regression model, a random forest regression model, a support vector machine, or any suitable type of a supervised learning model based on the quality and quantity of the data received. For example, the machine learning algorithm may include a model that assesses the performance of a wind turbine 102 and/or the wind farm 100 using the collected data from the UAVs 206. The machine learning algorithm described herein may also include an embedded reinforcement learning technique.

In various embodiments, various machine learning algorithms may be employed in the systems and methods of the present disclosure to iteratively refine the logic and/or the model-based simulations or estimators, virtual representations or simulations, models, sub-models, and/or estimators. As such, in certain embodiments, the machine learning algorithm(s) may receive data sent from the sensor(s) 208 of the UAV(s) 206 and can train such data. Particularly, the machine learning algorithm(s) described herein may allow for the interpretation of data retrieved by the sensor(s) 208, or the emitter/receiver 306, 310. The data retrieved may also be used to train and further refine the machine learning algorithm(s) described herein. For example, a value within the machine learning algorithm(s) may be modified based upon the data retrieved and continuously updated. In certain embodiments, as an example, if the wake 212 is monitored (FIG. 3), the data corresponding to a location of the wake 212 may be input into the machine learning algorithm. The machine learning algorithm may then learn from the data over time to more accurately determine the shape or location of the wake 212 and/or to predict a future location of the wake 212.

Further, the machine learning algorithm may be configured to model the wind turbine(s) 102 and/or the wind farm 100 using sensor(s) 208. In an embodiment, for example, the model may be generated using the machine learning algorithm, which may perform a regression that correlates the relationship between data collected from the sensor(s) 208 to the performance of the wind turbine(s) 102. This correlation may then be used to optimize the performance of the wind turbine(s) 102 and/or the wind farm 100. The machine learning algorithm(s) described herein may also be configured to generate a variance which can be used to determine a location or areas where the greatest uncertainty or variance exists for an area within the wind farm 100 and/or around the wind turbine(s) 102. For example, a parameter may be set corresponding to the total area that the UAV(s) 208 should observe around the wind farm 100 or the wind turbine(s) 102. The machine learning algorithm may then assess a location where data was collected by the UAV(s) 206 and determine that another location in relation to the wind farm 100 or wind turbine 102 may help improve accuracy of the machine learning algorithm. For example, the location may be an area where data has not been yet monitored or a location where environmental conditions are unknown. Generating a variance may also include providing a prioritized list of desired data. The desired data may point to a particular location such as a second location to retrieve data. The second location may then include an area with the greatest amount of uncertainty for the data provided to the machine learning algorithm and the highest value of use for improving the machine learning algorithm.

In still further embodiments, the machine learning algorithm(s) described herein may also be configured to generate a power curve that plots the relationship between wind speed and power generated or expected to be generated by a respective wind turbine such as wind turbine(s) 102 (see e.g., FIGS. 3-6). In an exemplary embodiment, for example, the UAV(s) 206 may be maneuvered according to the power curve, e.g., to the front of the wind turbine 102, as an example, and the sensor(s) 208 may be an anemometer (see e.g., FIGS. 3-4). The UAV(s) 206 may then be maneuvered to multiple locations in front of the wind turbine(s) 102. By maneuvering the UAV(s) 206 to multiple locations, additional data may be provided to update the power curve, thereby increasing the accuracy of the generated power curve and/or increasing the scope of information provided by the power curve. The machine learning algorithm(s) may also be configured to generate other models of power performance vs. wind conditions for the wind turbine(s) 102.

The data output by the machine learning algorithm(s) may be used to determine turbine-level or farm-level control strategies targeted at maximizing Annual Energy Production (AEP) and/or minimizing loads or turbine wear. For example, the machine learning algorithm(s) described herein may determine that AEP may be maximized by orienting the nacelle(s) 116 of the wind turbine(s) 102 in a particular direction based on environmental conditions. In an embodiment, for example, the machine learning algorithm(s) may determine that adjusting the pitch, tip-speed ratio, the yaw, or the speed of the wind turbine(s) 102 may improve AEP or minimize turbine/grid loads or turbine wear.

The machine learning algorithm(s) may also be configured to implement an adaptive design of experiments. For example, the UAV(s) 206 may be maneuvered throughout the wind farm 100 and may collect data in the wind farm 100. The data may then be input into machine learning algorithm(s). The data provided by the UAV(s) 206, is used, in addition to the data provided by the fixed sensors 111, to create and/or update machine learning models that describe turbine performance and are used to optimize turbine and/or farm performance.

The processor(s) 402 may be further configured to calibrate and/or tune any of the aforementioned machine learning algorithms described herein.

In another embodiment, the processor(s) 402 may be further configured to implement a control action for the wind turbine 102, such as adjusting the pitch angle, tip-speed ratio, the yaw, or the speed of the wind turbine(s) 102 to improve AEP or minimize turbine/grid loads or turbine wear as determined by the machine learning algorithm(s). By changing the angle or direction of the rotor blades 112, a wake of one or more of the wind turbines 102 may be redirected away from the rotor blades 112 of another wind turbine, thereby increasing overall AEP. Accordingly, one of the wind turbines 102 may be redirected so as cause another wind turbine 102 to be positioned outside of the wake of the redirected wind turbine 102. The processor(s) 402 may also be configured to derate or uprate the power on wind turbine 102 or multiple wind turbines 102 as needed depending on wind conditions or predicted wind conditions.

Figure 8:
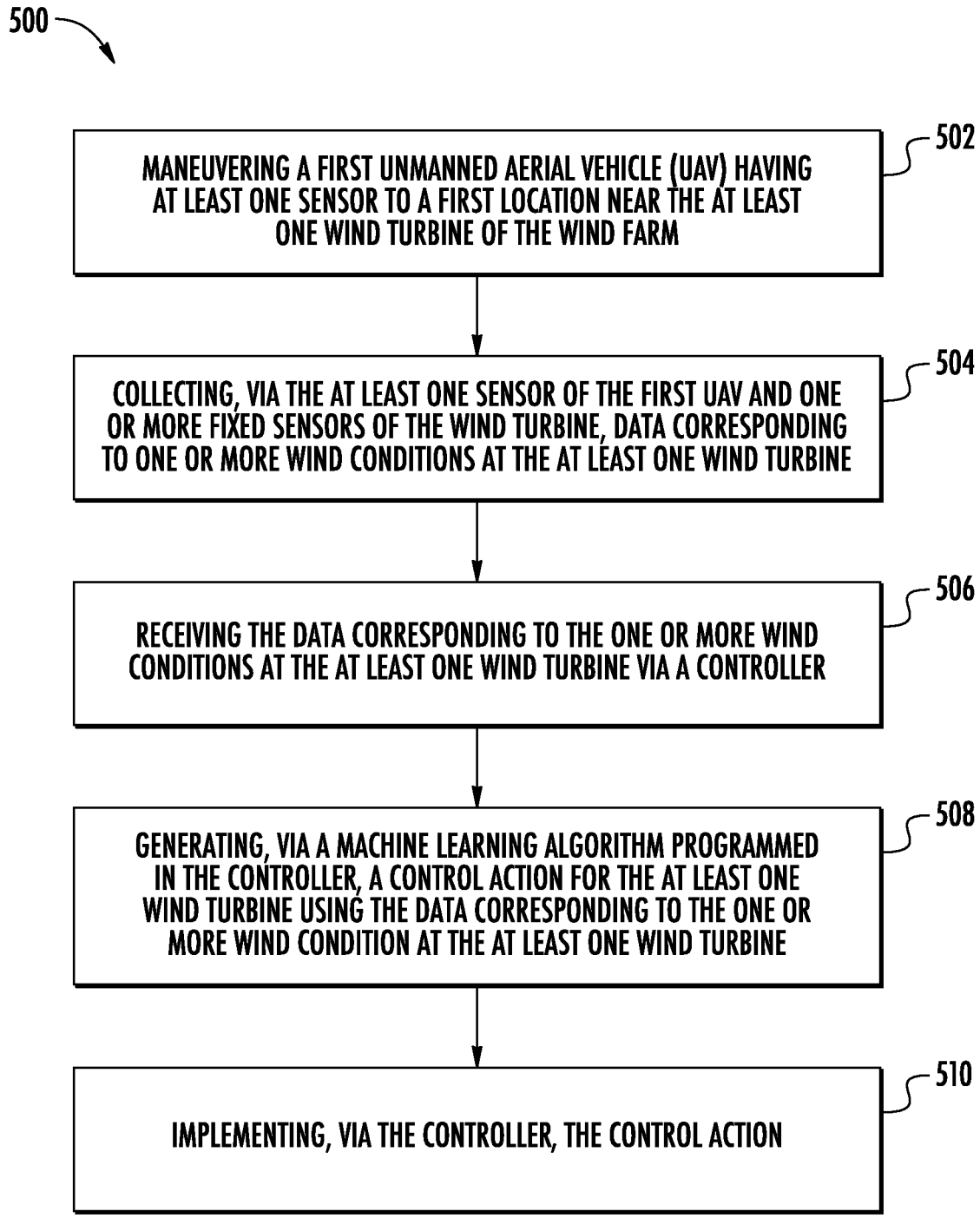
FIG. 8 provides a flow diagram of an embodiment of a method for optimizing performance of a wind farm according to the present disclosure.

In an additional embodiment, the data collected by the UAVs 206 can be continuously updated. Accordingly, the machine learning algorithm(s) can be trained to predict wind conditions or other environmental conditions such that the UAV(s) 206 no longer need to be present for an adaptation to the wind turbine(s) 102 to adapt to the wind conditions to be implemented. For example, the data can be continuously sending to an archival repository or the controller(s) 104, 108 such that the data can be used for turbine/farm control as guided by the learned machine learning algorithm(s). In addition, data can be configured to be used for offline training or continuous updating or optimization of the machine learning algorithm using the data Referring now to FIG. 8, various embodiments of methods for optimizing wind farms and/or wind turbines are illustrated. In general, the methods will be described herein with reference to the wind farm 100 and/or the wind turbine(s) 102 shown in FIGS. 1-7. However, it should be appreciated that the disclosed methods may be implemented with wind farms and/or wind turbines having any other suitable configurations. In addition, although FIG. 8 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring particularly to FIG. 8, a flow diagram of an embodiment of a method 500 of optimizing performance of a wind farm is illustrated according to the present disclosure. As shown at (502), the method 500 may include maneuvering a first unmanned aerial vehicle (UAV) having at least one sensor to a first location near the at least one wind turbine of the wind farm. As shown at (504), the method 500 may include collecting, via the at least one sensor of the first UAV and one or more fixed sensors of the wind turbine, data corresponding to one or more wind conditions at the at least one wind turbine. As shown at (506), the method 500 may include receiving the data corresponding to the one or more wind conditions at the at least one wind turbine via a controller. As shown at (508), the method 500 may include generating, via a machine learning algorithm programmed in the controller, a control action for the at least one wind turbine using the data corresponding to the one or more wind condition at the at least one wind turbine As shown at (510), the method 500 may include implementing, via the controller, the control action.

Various aspects and embodiments of the present invention are defined by the following numbered clauses:

Clause 1. A method for optimizing performance of a wind farm having at least one wind turbine, the method comprising:
  maneuvering a first unmanned aerial vehicle (UAV) having at least one sensor to a first location near the at least one wind turbine of the wind farm;
  collecting, via the at least one sensor of the first UAV, data corresponding to one or more wind conditions at the at least one wind turbine;
  receiving the data corresponding to the one or more wind conditions at the at least one wind turbine via a controller;
  generating a control action for the at least one wind turbine using the data corresponding to the one or more wind condition at the at least one wind turbine; and
  implementing, via the controller, the control action.

Clause 2. The method of clause 1, wherein the control action is generated via at least one machine learning algorithm programmed in the controller, wherein the data is input within the machine learning algorithm.

Clause 3. The method of any of clauses 1-2, wherein the one or more wind conditions comprises at least one of wind speed, wind shear, wind direction, wake, turbulence intensity, temperature, humidity, or air density.

Clause 4. The method of any of clauses 1-3, wherein the wind farm comprises a plurality of wind turbines, the plurality of wind turbines comprising the at least one wind turbine,
  wherein the control action further comprises at least one of pitching one or more rotor blades of one or more of the plurality of wind turbines, yawing one or more of the plurality of wind turbines, modifying a speed of one or more of the plurality of wind turbines, derating power on one or more of the plurality of wind turbines, or uprating power on one or more of the plurality of wind turbines.

Clause 5. The method of clause 4, wherein the at least one wind turbine is a first wind turbine, wherein the plurality of wind turbines further comprises a second wind turbine,
  wherein the control action further comprises implementing the control action on the first wind turbine so as to cause the second wind turbine to be positioned outside of wake of the first wind turbine.

Clause 6. The method of any of clauses 3-5, wherein the controller is further configured to generate a power curve or other model of power performance vs. wind conditions for the at least one wind turbine.

Clause 7. The method of any of clauses 1-6, further comprising maneuvering the first UAV to a second location around the at least one wind turbine different from the first location.

Clause 8. The method of any of clauses 2-7, further comprising continuously sending the data to an archival repository, turbine, or farm level controller such that the data can be used for turbine/farm control as guided by the learned machine learning algorithm, wherein the data is configured to be used for offline training or continuous updating or optimization of the machine learning algorithm using the data.

Clause 9. The method of any of clauses 2-8, wherein the machine learning algorithm is further configured to generate a simulated model of the wind farm for estimating or predicting performance of the wind farm or the at least one wind turbine.

Clause 10. The method of clause 9, further comprising:
  generating, via the machine learning algorithm, a prioritized list of desired data that instructs the most desired second location to retrieve the data, wherein the second location comprises an area with the greatest uncertainty and highest value for use in improving the machine learning algorithm; and
  maneuvering the UAV to the second location.

Clause 11. The method of any of clauses 1-10, further comprising transmitting the data to the controller in real-time.

Clause 12. The method of any of clauses 1-11 further comprising:
  maneuvering a second UAV around the at least one wind turbine; and collecting additional data relating to the wind farm using a sensor mounted to the second UAV.

Clause 13. The method of any of clauses 1-12, wherein the first UAV further comprises an emitter and an receiver mounted thereto, wherein the method further comprises:
emitting, via the emitter, an acoustic signal;
receiving the acoustic signal via the acoustic receiver; and
determining the one or more wind conditions based on changes in the acoustic signal as the acoustic signal moves from the emitter to the receiver.

Clause 14. The method of any of clauses 1-13, wherein the method further comprises collecting, via one or more fixed sensors of the wind turbine, data corresponding to one or more wind conditions at the at least one wind turbine, wherein the one or more fixed sensors comprise at least one of LIDAR, sonar, or sensors capable of detecting wind speed, temperature, pressure, humidity, air density, or power generated by the at least one wind turbine.

Clause 15. A system for optimizing performance of a wind farm having at least one wind turbine, the system comprising:
the at least one wind turbine of the wind farm;
a first unmanned aerial vehicle (UAV) having at least one sensor, the sensor configured to collect data corresponding to one or more wind conditions at the at least one wind turbine;
a controller configured to receive the data corresponding to one or more wind conditions at the at least one wind turbine;
wherein the controller generates a control action for the at least one wind turbine using the data corresponding to the one or more wind condition at the at least one wind turbine, wherein the control action is implemented via the controller.

Clause 16. The system of clause 15 further comprising a machine learning algorithm programmed within the controller, wherein the control action is generated via a machine learning algorithm.

Clause 17. The system of any of clauses 15-16, wherein the wind farm comprises a plurality of wind turbines, the plurality of wind turbines comprising the at least one wind turbine,
wherein the control action further comprises at least one of pitching one or more rotor blades of one or more of the plurality of wind turbines, yawing one or more of the plurality of wind turbines, modifying a speed of one or more of the plurality of wind turbines, derating power on one or more of the plurality of wind turbines, or uprating power on one or more of the plurality of wind turbines.

Clause 18. The system of clauses 17, wherein the at least one wind turbine is a first wind turbine, wherein the plurality of wind turbines further comprises a second wind turbine, wherein the control action further comprises implementing the control action on the first wind turbine so as cause the second wind turbine to be positioned outside of wake of the first wind turbine.

Clause 19. The system of any of clauses 15-18, wherein the system comprises one or more fixed sensors provided on the at least one wind turbine, the one or more fixed sensors configured to collect data corresponding to one or more wind conditions at the at least one wind turbine.

Clause 20. A method for optimizing performance of a wind farm having at least one wind turbine, the method comprising:
maneuvering a first unmanned aerial vehicle (UAV) having at least one sensor to a first location near the at least one wind turbine of the wind farm;
collecting, via the at least one sensor of the first UAV, data corresponding to one or more wind conditions at the at least one wind turbine;
receiving the data corresponding to the one or more wind conditions at the at least one wind turbine via a controller;
generating, via a machine learning algorithm programmed in the controller, a control action for the at least one wind turbine using the data corresponding to the one or more wind condition at the at least one wind turbine; and
implementing, via the controller, the control action.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method for optimizing performance of a wind farm having at least one wind turbine, the method comprising:
maneuvering a first unmanned aerial vehicle (UAV) having at least one sensor to a first location near the at least one wind turbine of the wind farm;
collecting, via the at least one sensor of the first UAV, data corresponding to one or more wind conditions at the at least one wind turbine;
receiving the data corresponding to the one or more wind conditions at the at least one wind turbine via a controller;
generating, via a machine learning algorithm programmed in the controller, a control action for the at least one wind turbine using the data corresponding to the one or more wind condition at the at least one wind turbine;
implementing, via the controller, the control action;

generating, via the machine learning algorithm, a prioritized list of desired data that instructs a second location to retrieve the data, wherein the second location comprises an area with the greatest uncertainty and highest value for use in improving the machine learning algorithm; and maneuvering the first UAV to the second location.

2. The method of claim 1, wherein the one or more wind conditions comprises at least one of wind speed, wind shear, wind direction, wake, turbulence intensity, temperature, humidity, or air density.

3. The method of claim 1, wherein the wind farm comprises a plurality of wind turbines, the plurality of wind turbines comprising the at least one wind turbine, wherein the control action further comprises at least one of pitching one or more rotor blades of one or more of the plurality of wind turbines, yawing one or more of the plurality of wind turbines, modifying a speed of one or more of the plurality of wind turbines, derating power on one or more of the plurality of wind turbines, or uprating power on one or more of the plurality of wind turbines.

4. The method of claim 3, wherein the at least one wind turbine is a first wind turbine, wherein the plurality of wind turbines further comprises a second wind turbine, wherein the control action further comprises implementing the control action on the first wind turbine so as to cause the second wind turbine to be positioned outside of wake of the first wind turbine.

5. The method of claim 1, wherein the controller is further configured to generate a power curve or other model of power performance versus wind conditions for the at least one wind turbine.

6. The method of claim 1, further comprising maneuvering the first UAV to a second location around the at least one wind turbine different from the first location.

7. The method of claim 2, further comprising continuously sending the data to an archival repository, turbine, or farm level controller such that the data can be used for turbine/farm control as guided by the learned machine learning algorithm, wherein the data is configured to be used for offline training or continuous updating or optimization of the machine learning algorithm using the data.

8. The method of claim 1, wherein the machine learning algorithm is further configured to generate a simulated model of the wind farm for estimating or predicting performance of the wind farm or the at least one wind turbine.

9. The method of claim 1, further comprising transmitting the data to the controller in real-time.

10. The method of claim 1 further comprising:

maneuvering a second UAV around the at least one wind turbine; and collecting additional data relating to the wind farm using a sensor mounted to the second UAV.

11. The method of claim 1, wherein the first UAV further comprises an emitter and a receiver mounted thereto, wherein the method further comprises:

emitting, via the emitter, an acoustic signal;

receiving the acoustic signal via the acoustic receiver; and determining the one or more wind conditions based on changes in the acoustic signal as the acoustic signal moves from the emitter to the receiver.

12. The method of claim 1, wherein the method further comprises collecting, via one or more fixed sensors of the wind turbine, data corresponding to one or more wind conditions at the at least one wind turbine, wherein the one or more fixed sensors comprise at least one of LIDAR, sonar, or sensors capable of detecting wind speed, temperature, pressure, humidity, air density, or power generated by the at least one wind turbine.

13. A system for optimizing performance of a wind farm having at least one wind turbine, the system comprising:

the at least one wind turbine of the wind farm;

a first unmanned aerial vehicle (UAV) having at least one sensor, the sensor configured to collect data corresponding to one or more wind conditions at the at least one wind turbine;

a controller configured to receive the data corresponding to one or more wind conditions at the at least one wind turbine;

wherein the controller generates, via a machine learning algorithm programmed in the controller, a control action for the at least one wind turbine using the data corresponding to the one or more wind condition at the at least one wind turbine, wherein the control action is implemented via the controller, wherein the controller generates, via the machine learning algorithm, a prioritized list of desired data that instructs a location to retrieve the data, the location comprises an area with the greatest uncertainty and highest value for use in improving the machine learning algorithm, wherein the first UAV is configured to maneuver to the location.

14. The system of claim 13, wherein the wind farm comprises a plurality of wind turbines, the plurality of wind turbines comprising the at least one wind turbine, wherein the control action further comprises at least one of pitching one or more rotor blades of one or more of the plurality of wind turbines, yawing one or more of the plurality of wind turbines, modifying a speed of one or more of the plurality of wind turbines, derating power on one or more of the plurality of wind turbines, or uprating power on one or more of the plurality of wind turbines.

15. The system of claim 14, wherein the at least one wind turbine is a first wind turbine, wherein the plurality of wind turbines further comprises a second wind turbine, wherein the control action further comprises implementing the control action on the first wind turbine so as cause the second wind turbine to be positioned outside of wake of the first wind turbine.

16. The system of claim 13, wherein the system comprises one or more fixed sensors provided on the at least one wind turbine, the one or more fixed sensors configured to collect data corresponding to one or more wind conditions at the at least one wind turbine.

* * * * *